(12) United States Patent
Drasnin

(10) Patent No.: US 8,949,477 B2
(45) Date of Patent: Feb. 3, 2015

(54) ACCESSORY DEVICE ARCHITECTURE

(71) Applicant: Microsoft Corporation, Redmond, WA (US)

(72) Inventor: Sharon Drasnin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/653,682

(22) Filed: Oct. 17, 2012

(65) Prior Publication Data

US 2013/0300647 A1 Nov. 14, 2013

Related U.S. Application Data

(63) Continuation of application No. 13/527,263, filed on Jun. 19, 2012.

(60) Provisional application No. 61/646,799, filed on May 14, 2012.

(51) Int. Cl.
 *G06F 13/12* (2006.01)
 *G06F 1/32* (2006.01)

(52) U.S. Cl.
 USPC ............................................. 710/8; 713/300

(58) Field of Classification Search
 CPC combination set(s) only.
 See application file for complete search history.

(56) References Cited

U.S. PATENT DOCUMENTS

| | | | |
|---|---|---|---|
| 3,879,586 A | 4/1975 | DuRocher et al. | |
| 4,046,975 A | 9/1977 | Seeger, Jr. | |
| 4,065,649 A | 12/1977 | Carter et al. | |
| 4,086,451 A | 4/1978 | Boulanger | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,577,822 A | 3/1986 | Wilkerson | |
| 4,588,187 A | 5/1986 | Dell | |
| 4,607,147 A | 8/1986 | Ono et al. | |

(Continued)

FOREIGN PATENT DOCUMENTS

| | | |
|---|---|---|
| CA | 990023 | 6/1976 |
| CN | 103455149 | 12/2013 |

(Continued)

OTHER PUBLICATIONS

"Accessing Device Sensors", retrieved from <https://developer.palm.com/content/api/dev-guide/pdk/accessing-device-sensors.html> on May 25, 2012, 4 pages.

(Continued)

*Primary Examiner* — Ilwoo Park
(74) *Attorney, Agent, or Firm* — Jeremy Snodgrass; Judy Yee; Micky Minhas

(57) ABSTRACT

An accessory device architecture is described. In one or more implementations, data is received from an accessory device at an intermediate processor of a computing device, the data usable to enumerate functionality of the accessory device for operation as part of a computing device that includes the intermediate processor. The data is passed by the intermediate processor to an operating system executed on processor of the computing device to enumerate the functionality of the accessory device as part of the intermediate processor.

22 Claims, 6 Drawing Sheets

(56) References Cited

U.S. PATENT DOCUMENTS

| | | |
|---|---|---|
| 4,651,133 A | 3/1987 | Ganesan et al. |
| 4,735,394 A | 4/1988 | Facco |
| 5,008,497 A | 4/1991 | Asher |
| 5,021,638 A | 6/1991 | Nopper et al. |
| 5,128,829 A | 7/1992 | Loew |
| 5,220,521 A | 6/1993 | Kikinis |
| 5,283,559 A | 2/1994 | Kalendra et al. |
| 5,331,443 A | 7/1994 | Stanisci |
| 5,363,075 A | 11/1994 | Fanucchi |
| 5,375,076 A | 12/1994 | Goodrich et al. |
| 5,480,118 A | 1/1996 | Cross |
| 5,546,271 A | 8/1996 | Gut et al. |
| 5,548,477 A | 8/1996 | Kumar et al. |
| 5,558,577 A | 9/1996 | Kato |
| 5,666,112 A | 9/1997 | Crowley et al. |
| 5,681,220 A | 10/1997 | Bertram et al. |
| 5,737,183 A | 4/1998 | Kobayashi et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,874,697 A | 2/1999 | Selker et al. |
| 5,905,485 A | 5/1999 | Podoloff |
| 5,924,555 A | 7/1999 | Sadamori et al. |
| 5,926,170 A | 7/1999 | Oba |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,042,075 A | 3/2000 | Burch, Jr. |
| 6,044,717 A | 4/2000 | Biegelsen et al. |
| 6,061,644 A | 5/2000 | Leis |
| 6,108,200 A | 8/2000 | Fullerton |
| 6,128,007 A | 10/2000 | Seybold |
| 6,141,388 A | 10/2000 | Servais et al. |
| 6,178,443 B1 | 1/2001 | Lin |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,366,440 B1 | 4/2002 | Kung |
| 6,380,497 B1 | 4/2002 | Hashimoto et al. |
| 6,437,682 B1 | 8/2002 | Vance |
| 6,450,046 B1 | 9/2002 | Maeda |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,585,435 B2 | 7/2003 | Fang |
| 6,597,347 B1 | 7/2003 | Yasutake |
| 6,600,121 B1 | 7/2003 | Olodort et al. |
| 6,603,408 B1 | 8/2003 | Gaba |
| 6,603,461 B2 | 8/2003 | Smith, Jr. et al. |
| 6,608,664 B1 | 8/2003 | Hasegawa |
| 6,617,536 B2 | 9/2003 | Kawaguchi |
| 6,651,943 B2 | 11/2003 | Cho et al. |
| 6,684,166 B2 | 1/2004 | Bellwood et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,780,019 B1 | 8/2004 | Ghosh et al. |
| 6,781,819 B2 | 8/2004 | Yang et al. |
| 6,784,869 B1 | 8/2004 | Clark et al. |
| 6,798,887 B1 | 9/2004 | Andre |
| 6,813,143 B2 | 11/2004 | Makela |
| 6,819,316 B2 | 11/2004 | Schulz et al. |
| 6,856,506 B2 | 2/2005 | Doherty et al. |
| 6,856,789 B2 | 2/2005 | Pattabiraman et al. |
| 6,861,961 B2 | 3/2005 | Sandbach et al. |
| 6,909,354 B2 | 6/2005 | Baker et al. |
| 6,914,197 B2 | 7/2005 | Doherty et al. |
| 6,950,950 B2 | 9/2005 | Sawyers et al. |
| 6,962,454 B1 | 11/2005 | Costello |
| 6,970,957 B1 | 11/2005 | Oshins et al. |
| 6,976,799 B2 | 12/2005 | Kim et al. |
| 7,007,238 B2 | 2/2006 | Glaser |
| 7,051,149 B2 | 5/2006 | Wang et al. |
| 7,091,436 B2 | 8/2006 | Serban |
| 7,099,149 B2 | 8/2006 | Krieger et al. |
| 7,106,222 B2 | 9/2006 | Ward et al. |
| 7,123,292 B1 | 10/2006 | Seeger et al. |
| D535,292 S | 1/2007 | Shi et al. |
| 7,194,662 B2 | 3/2007 | Do et al. |
| 7,213,991 B2 | 5/2007 | Chapman et al. |
| 7,252,512 B2 | 8/2007 | Tai et al. |
| 7,260,221 B1 | 8/2007 | Atsmon |
| 7,277,087 B2 | 10/2007 | Hill et al. |
| 7,301,759 B2 | 11/2007 | Hsiung |
| 7,365,967 B2 | 4/2008 | Zheng |
| 7,447,934 B2 | 11/2008 | Dasari et al. |
| 7,457,108 B2 | 11/2008 | Ghosh |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,542,052 B2 | 6/2009 | Solomon et al. |
| 7,558,594 B2 | 7/2009 | Wilson |
| 7,559,834 B1 | 7/2009 | York |
| RE40,891 E | 9/2009 | Yasutake |
| 7,636,921 B2 | 12/2009 | Louie |
| 7,639,329 B2 | 12/2009 | Takeda et al. |
| 7,656,392 B2 | 2/2010 | Bolender |
| 7,729,493 B2 | 6/2010 | Krieger et al. |
| 7,731,147 B2 | 6/2010 | Rha |
| 7,733,326 B1 | 6/2010 | Adiseshan |
| 7,761,119 B2 | 7/2010 | Patel |
| 7,777,972 B1 | 8/2010 | Chen et al. |
| 7,782,342 B2 | 8/2010 | Koh |
| 7,813,715 B2 | 10/2010 | McKillop et al. |
| 7,822,338 B2 | 10/2010 | Wernersson |
| 7,865,639 B2 | 1/2011 | McCoy et al. |
| 7,884,807 B2 | 2/2011 | Hovden et al. |
| 7,893,921 B2 | 2/2011 | Sato |
| D636,397 S | 4/2011 | Green |
| 7,928,964 B2 | 4/2011 | Kolmykov-Zotov et al. |
| 7,932,890 B2 | 4/2011 | Onikiri et al. |
| 7,944,520 B2 | 5/2011 | Ichioka et al. |
| 7,945,717 B2 | 5/2011 | Rivalsi |
| 7,973,771 B2 | 7/2011 | Geaghan |
| 7,978,281 B2 | 7/2011 | Vergith et al. |
| 8,016,255 B2 | 9/2011 | Lin |
| 8,053,688 B2 | 11/2011 | Conzola et al. |
| 8,059,384 B2 | 11/2011 | Park et al. |
| 8,065,624 B2 | 11/2011 | Morin et al. |
| 8,069,356 B2 | 11/2011 | Rathi et al. |
| 8,090,885 B2 | 1/2012 | Callaghan et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,120,166 B2 | 2/2012 | Koizumi et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,229,509 B2 | 7/2012 | Paek et al. |
| 8,229,522 B2 | 7/2012 | Kim et al. |
| 8,231,099 B2 | 7/2012 | Chen |
| 8,248,791 B2 | 8/2012 | Wang et al. |
| 8,255,708 B1 * | 8/2012 | Zhang ............................ 713/300 |
| 8,264,310 B2 | 9/2012 | Lauder et al. |
| 8,267,368 B2 | 9/2012 | Torii et al. |
| 8,274,784 B2 | 9/2012 | Franz et al. |
| 8,279,589 B2 | 10/2012 | Kim |
| 8,322,290 B1 | 12/2012 | Mignano |

(56) References Cited

U.S. PATENT DOCUMENTS

| | | | |
|---|---|---|---|
| 8,346,206 B1 | 1/2013 | Andrus et al. | |
| 8,387,078 B2* | 2/2013 | Memmott | 719/330 |
| 8,403,576 B2 | 3/2013 | Merz | |
| 8,416,559 B2 | 4/2013 | Agata et al. | |
| 8,498,100 B1 | 7/2013 | Whitt, III et al. | |
| 8,543,227 B1 | 9/2013 | Perek et al. | |
| 8,548,608 B2 | 10/2013 | Perek et al. | |
| 8,564,944 B2 | 10/2013 | Whitt, III et al. | |
| 8,570,725 B2 | 10/2013 | Whitt, III et al. | |
| 8,599,542 B1 | 12/2013 | Healey et al. | |
| 8,610,015 B2 | 12/2013 | Whitt et al. | |
| 8,614,666 B2 | 12/2013 | Whitman et al. | |
| 8,646,999 B2 | 2/2014 | Shaw et al. | |
| 8,674,941 B2 | 3/2014 | Casparian et al. | |
| 8,699,215 B2 | 4/2014 | Whitt, III et al. | |
| 8,719,603 B2 | 5/2014 | Belesiu et al. | |
| 8,724,302 B2 | 5/2014 | Whitt et al. | |
| 8,744,391 B2 | 6/2014 | Tenbrook et al. | |
| 8,762,746 B1 | 6/2014 | Lachwani et al. | |
| 8,780,541 B2 | 7/2014 | Whitt et al. | |
| 8,791,382 B2 | 7/2014 | Whitt, III et al. | |
| 8,825,187 B1 | 9/2014 | Hamrick et al. | |
| 8,830,668 B2 | 9/2014 | Whitt, III et al. | |
| 8,850,241 B2 | 9/2014 | Oler et al. | |
| 8,854,799 B2 | 10/2014 | Whitt, III et al. | |
| 8,873,227 B2 | 10/2014 | Whitt et al. | |
| 8,896,993 B2 | 11/2014 | Belesiu et al. | |
| 8,903,517 B2 | 12/2014 | Perek et al. | |
| 2001/0023818 A1 | 9/2001 | Masaru et al. | |
| 2002/0005108 A1 | 1/2002 | Ludwig | |
| 2002/0044216 A1 | 4/2002 | Cha | |
| 2002/0134828 A1 | 9/2002 | Sandbach et al. | |
| 2002/0135457 A1 | 9/2002 | Sandbach et al. | |
| 2003/0007648 A1 | 1/2003 | Currell | |
| 2003/0011576 A1 | 1/2003 | Sandbach et al. | |
| 2003/0051983 A1 | 3/2003 | Lahr | |
| 2003/0067450 A1 | 4/2003 | Thursfield et al. | |
| 2003/0108720 A1 | 6/2003 | Kashino | |
| 2003/0163611 A1* | 8/2003 | Nagao | 710/10 |
| 2003/0197687 A1 | 10/2003 | Shetter | |
| 2003/0231243 A1 | 12/2003 | Shibutani | |
| 2004/0005184 A1 | 1/2004 | Kim et al. | |
| 2004/0056843 A1 | 3/2004 | Lin et al. | |
| 2004/0113956 A1 | 6/2004 | Bellwood et al. | |
| 2004/0156168 A1 | 8/2004 | LeVasseur et al. | |
| 2004/0160734 A1 | 8/2004 | Yim | |
| 2004/0169641 A1 | 9/2004 | Bean et al. | |
| 2004/0212598 A1 | 10/2004 | Kraus et al. | |
| 2004/0212601 A1 | 10/2004 | Cake et al. | |
| 2004/0258924 A1 | 12/2004 | Berger et al. | |
| 2004/0268000 A1 | 12/2004 | Barker et al. | |
| 2005/0030728 A1 | 2/2005 | Kawashima et al. | |
| 2005/0052831 A1 | 3/2005 | Chen | |
| 2005/0055498 A1 | 3/2005 | Beckert et al. | |
| 2005/0057515 A1 | 3/2005 | Bathiche | |
| 2005/0059489 A1 | 3/2005 | Kim | |
| 2005/0062715 A1 | 3/2005 | Tsuji et al. | |
| 2005/0099400 A1 | 5/2005 | Lee | |
| 2005/0134717 A1 | 6/2005 | Misawa | |
| 2005/0146512 A1 | 7/2005 | Hill et al. | |
| 2005/0236848 A1 | 10/2005 | Kim et al. | |
| 2005/0264653 A1 | 12/2005 | Starkweather et al. | |
| 2005/0264988 A1 | 12/2005 | Nicolosi | |
| 2005/0283731 A1 | 12/2005 | Saint-Hilaire et al. | |
| 2006/0049920 A1 | 3/2006 | Sadler et al. | |
| 2006/0085658 A1 | 4/2006 | Allen et al. | |
| 2006/0092139 A1 | 5/2006 | Sharma | |
| 2006/0096392 A1 | 5/2006 | Inkster et al. | |
| 2006/0125799 A1 | 6/2006 | Hillis et al. | |
| 2006/0154725 A1 | 7/2006 | Glaser et al. | |
| 2006/0155391 A1 | 7/2006 | Pistemaa et al. | |
| 2006/0156415 A1 | 7/2006 | Rubinstein et al. | |
| 2006/0174143 A1 | 8/2006 | Sawyers et al. | |
| 2006/0181514 A1 | 8/2006 | Newman | |
| 2006/0187216 A1 | 8/2006 | Trent, Jr. et al. | |
| 2006/0192763 A1 | 8/2006 | Ziemkowski | |
| 2006/0195522 A1 | 8/2006 | Miyazaki | |
| 2006/0265617 A1 | 11/2006 | Priborsky | |
| 2006/0267931 A1 | 11/2006 | Vainio et al. | |
| 2006/0272429 A1 | 12/2006 | Ganapathi et al. | |
| 2007/0003267 A1 | 1/2007 | Shibutani | |
| 2007/0056385 A1 | 3/2007 | Lorenz | |
| 2007/0062089 A1 | 3/2007 | Homer et al. | |
| 2007/0069153 A1 | 3/2007 | Pai-Paranjape et al. | |
| 2007/0072474 A1 | 3/2007 | Beasley et al. | |
| 2007/0117600 A1 | 5/2007 | Robertson et al. | |
| 2007/0121956 A1 | 5/2007 | Bai et al. | |
| 2007/0145945 A1 | 6/2007 | McGinley et al. | |
| 2007/0172229 A1 | 7/2007 | Wernersson | |
| 2007/0176902 A1 | 8/2007 | Newman et al. | |
| 2007/0178891 A1 | 8/2007 | Louch et al. | |
| 2007/0182663 A1 | 8/2007 | Biech | |
| 2007/0182722 A1 | 8/2007 | Hotelling et al. | |
| 2007/0185590 A1 | 8/2007 | Reindel et al. | |
| 2007/0200830 A1 | 8/2007 | Yamamoto | |
| 2007/0220708 A1 | 9/2007 | Lewis | |
| 2007/0230227 A1 | 10/2007 | Palmer | |
| 2007/0234420 A1 | 10/2007 | Novotney et al. | |
| 2007/0236408 A1 | 10/2007 | Yamaguchi et al. | |
| 2007/0236475 A1 | 10/2007 | Wherry | |
| 2007/0236873 A1 | 10/2007 | Yukawa et al. | |
| 2007/0247432 A1 | 10/2007 | Oakley | |
| 2007/0252674 A1 | 11/2007 | Nelson et al. | |
| 2007/0260892 A1 | 11/2007 | Paul et al. | |
| 2007/0283179 A1 | 12/2007 | Burnett et al. | |
| 2007/0296709 A1 | 12/2007 | Guanghai | |
| 2007/0297625 A1 | 12/2007 | Hjort et al. | |
| 2008/0005423 A1 | 1/2008 | Jacobs et al. | |
| 2008/0053222 A1 | 3/2008 | Ehrensvard et al. | |
| 2008/0059888 A1 | 3/2008 | Dunko | |
| 2008/0104437 A1 | 5/2008 | Lee | |
| 2008/0129520 A1 | 6/2008 | Lee | |
| 2008/0151478 A1 | 6/2008 | Chern | |
| 2008/0158185 A1 | 7/2008 | Westerman | |
| 2008/0174570 A1 | 7/2008 | Jobs et al. | |
| 2008/0186660 A1 | 8/2008 | Yang | |
| 2008/0228969 A1* | 9/2008 | Cheah et al. | 710/69 |
| 2008/0238884 A1 | 10/2008 | Harish | |
| 2008/0253822 A1 | 10/2008 | Matias | |
| 2008/0307242 A1 | 12/2008 | Qu | |
| 2008/0316002 A1 | 12/2008 | Brunet et al. | |
| 2008/0316183 A1 | 12/2008 | Westerman et al. | |
| 2008/0320190 A1 | 12/2008 | Lydon et al. | |
| 2009/0009476 A1 | 1/2009 | Daley, III | |
| 2009/0073957 A1 | 3/2009 | Newland et al. | |
| 2009/0083562 A1 | 3/2009 | Park et al. | |
| 2009/0089600 A1 | 4/2009 | Nousiainen | |
| 2009/0102805 A1 | 4/2009 | Meijer et al. | |
| 2009/0140985 A1 | 6/2009 | Liu | |
| 2009/0174759 A1 | 7/2009 | Yeh et al. | |
| 2009/0189873 A1 | 7/2009 | Peterson | |
| 2009/0195497 A1 | 8/2009 | Fitzgerald et al. | |
| 2009/0195518 A1 | 8/2009 | Mattice et al. | |
| 2009/0207144 A1 | 8/2009 | Bridger | |
| 2009/0231275 A1 | 9/2009 | Odgers | |
| 2009/0239586 A1 | 9/2009 | Boeve et al. | |
| 2009/0244832 A1 | 10/2009 | Behar et al. | |
| 2009/0251008 A1 | 10/2009 | Sugaya | |
| 2009/0259865 A1 | 10/2009 | Sheynblat et al. | |
| 2009/0262492 A1 | 10/2009 | Whitchurch et al. | |
| 2009/0265670 A1 | 10/2009 | Kim et al. | |
| 2009/0285491 A1 | 11/2009 | Ravenscroft et al. | |
| 2009/0296331 A1 | 12/2009 | Choy | |
| 2009/0303204 A1 | 12/2009 | Nasiri et al. | |
| 2009/0315830 A1 | 12/2009 | Westerman | |
| 2009/0320244 A1 | 12/2009 | Lin | |
| 2009/0321490 A1 | 12/2009 | Groene et al. | |
| 2010/0013319 A1 | 1/2010 | Kamiyama et al. | |
| 2010/0023869 A1 | 1/2010 | Saint-Hilaire et al. | |
| 2010/0026656 A1 | 2/2010 | Hotelling et al. | |
| 2010/0038821 A1 | 2/2010 | Jenkins et al. | |
| 2010/0039081 A1 | 2/2010 | Sip | |
| 2010/0045633 A1 | 2/2010 | Gettemy et al. | |
| 2010/0051432 A1 | 3/2010 | Lin et al. | |

(56) References Cited

U.S. PATENT DOCUMENTS

| | | |
|---|---|---|
| 2010/0052880 A1 | 3/2010 | Laitinen et al. |
| 2010/0053534 A1 | 3/2010 | Hsieh et al. |
| 2010/0054435 A1 | 3/2010 | Louch et al. |
| 2010/0056130 A1 | 3/2010 | Louch et al. |
| 2010/0073329 A1 | 3/2010 | Raman et al. |
| 2010/0077237 A1 | 3/2010 | Sawyers |
| 2010/0079379 A1 | 4/2010 | Demuynck et al. |
| 2010/0085321 A1 | 4/2010 | Pundsack |
| 2010/0102182 A1 | 4/2010 | Lin |
| 2010/0103112 A1 | 4/2010 | Yoo et al. |
| 2010/0105443 A1 | 4/2010 | Vaisanen |
| 2010/0106983 A1 | 4/2010 | Kasprzak et al. |
| 2010/0123686 A1 | 5/2010 | Klinghult et al. |
| 2010/0133398 A1 | 6/2010 | Chiu et al. |
| 2010/0142130 A1 | 6/2010 | Wang et al. |
| 2010/0148995 A1 | 6/2010 | Elias |
| 2010/0148999 A1 | 6/2010 | Casparian et al. |
| 2010/0149104 A1 | 6/2010 | Sim et al. |
| 2010/0149111 A1 | 6/2010 | Olien |
| 2010/0149377 A1 | 6/2010 | Shintani et al. |
| 2010/0156913 A1 | 6/2010 | Ortega et al. |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0205472 A1 | 8/2010 | Tupman et al. |
| 2010/0206614 A1 | 8/2010 | Park et al. |
| 2010/0222110 A1 | 9/2010 | Kim et al. |
| 2010/0235546 A1 | 9/2010 | Terlizzi et al. |
| 2010/0238620 A1 | 9/2010 | Fish |
| 2010/0250988 A1 | 9/2010 | Okuda et al. |
| 2010/0259482 A1 | 10/2010 | Ball |
| 2010/0265182 A1 | 10/2010 | Ball et al. |
| 2010/0271771 A1 | 10/2010 | Wu et al. |
| 2010/0274932 A1* | 10/2010 | Kose .................... 710/19 |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0309617 A1 | 12/2010 | Wang et al. |
| 2010/0313680 A1 | 12/2010 | Joung et al. |
| 2010/0315348 A1 | 12/2010 | Jellicoe et al. |
| 2010/0315373 A1 | 12/2010 | Steinhauser et al. |
| 2010/0321877 A1 | 12/2010 | Moser |
| 2010/0324457 A1 | 12/2010 | Bean et al. |
| 2010/0325155 A1 | 12/2010 | Skinner et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032127 A1 | 2/2011 | Roush |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0050576 A1 | 3/2011 | Forutanpour et al. |
| 2011/0050626 A1 | 3/2011 | Porter et al. |
| 2011/0055407 A1 | 3/2011 | Lydon et al. |
| 2011/0057724 A1 | 3/2011 | Pabon |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0107958 A1 | 5/2011 | Pance et al. |
| 2011/0113368 A1 | 5/2011 | Carvajal et al. |
| 2011/0115738 A1 | 5/2011 | Suzuki et al. |
| 2011/0117970 A1 | 5/2011 | Choi |
| 2011/0134032 A1 | 6/2011 | Chiu et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1* | 7/2011 | Minoo et al. .................... 710/73 |
| 2011/0167287 A1* | 7/2011 | Walsh et al. .................... 713/323 |
| 2011/0167391 A1 | 7/2011 | Momeyer et al. |
| 2011/0169762 A1 | 7/2011 | Weiss |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0184824 A1 | 7/2011 | George et al. |
| 2011/0188199 A1 | 8/2011 | Pan |
| 2011/0193787 A1 | 8/2011 | Morishige et al. |
| 2011/0205372 A1 | 8/2011 | Miramontes |
| 2011/0221678 A1 | 9/2011 | Davydov |
| 2011/0227913 A1 | 9/2011 | Hyndman |
| 2011/0231682 A1 | 9/2011 | Kakish et al. |
| 2011/0248152 A1 | 10/2011 | Svajda et al. |
| 2011/0248920 A1 | 10/2011 | Larsen |
| 2011/0248941 A1 | 10/2011 | Abdo et al. |
| 2011/0261001 A1 | 10/2011 | Liu |
| 2011/0266672 A1 | 11/2011 | Sylvester |
| 2011/0267272 A1 | 11/2011 | Meyer et al. |
| 2011/0273475 A1 | 11/2011 | Herz et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0302518 A1 | 12/2011 | Zhang |
| 2011/0304577 A1 | 12/2011 | Brown |
| 2011/0305875 A1 | 12/2011 | Sanford et al. |
| 2011/0316807 A1 | 12/2011 | Corrion |
| 2011/0320204 A1 | 12/2011 | Locker et al. |
| 2012/0002820 A1 | 1/2012 | Leichter |
| 2012/0007821 A1 | 1/2012 | Zaliva |
| 2012/0020490 A1 | 1/2012 | Leichter |
| 2012/0023401 A1 | 1/2012 | Arscott et al. |
| 2012/0023459 A1 | 1/2012 | Westerman |
| 2012/0024682 A1 | 2/2012 | Huang et al. |
| 2012/0026096 A1 | 2/2012 | Ku |
| 2012/0032887 A1 | 2/2012 | Chiu et al. |
| 2012/0032891 A1 | 2/2012 | Parivar |
| 2012/0038495 A1 | 2/2012 | Ishikawa |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0069540 A1 | 3/2012 | Lauder et al. |
| 2012/0075249 A1 | 3/2012 | Hoch |
| 2012/0077384 A1 | 3/2012 | Bar-Niv et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0139727 A1 | 6/2012 | Houvener et al. |
| 2012/0140396 A1 | 6/2012 | Zeliff et al. |
| 2012/0145525 A1 | 6/2012 | Ishikawa |
| 2012/0162693 A1 | 6/2012 | Ito |
| 2012/0175487 A1 | 7/2012 | Goto |
| 2012/0182242 A1 | 7/2012 | Lindahl et al. |
| 2012/0182249 A1 | 7/2012 | Endo et al. |
| 2012/0194448 A1 | 8/2012 | Rothkopf |
| 2012/0212438 A1 | 8/2012 | Vaisanen |
| 2012/0218194 A1 | 8/2012 | Silverman |
| 2012/0224073 A1 | 9/2012 | Miyahara |
| 2012/0229634 A1 | 9/2012 | Laett et al. |
| 2012/0242584 A1 | 9/2012 | Tuli |
| 2012/0246377 A1* | 9/2012 | Bhesania et al. .................... 710/313 |
| 2012/0249443 A1 | 10/2012 | Anderson et al. |
| 2012/0250873 A1 | 10/2012 | Bakalos et al. |
| 2012/0256959 A1 | 10/2012 | Ye et al. |
| 2012/0260177 A1 | 10/2012 | Sehrer |
| 2012/0274811 A1 | 11/2012 | Bakin |
| 2012/0299872 A1 | 11/2012 | Nishikawa et al. |
| 2012/0300275 A1 | 11/2012 | Vilardell et al. |
| 2012/0312955 A1 | 12/2012 | Randolph |
| 2013/0009413 A1 | 1/2013 | Chiu et al. |
| 2013/0027867 A1 | 1/2013 | Lauder et al. |
| 2013/0044074 A1 | 2/2013 | Park et al. |

(56) References Cited

U.S. PATENT DOCUMENTS

| | | |
|---|---|---|
| 2013/0063873 A1 | 3/2013 | Wodrich et al. |
| 2013/0067126 A1 | 3/2013 | Casparian et al. |
| 2013/0073877 A1 | 3/2013 | Radke |
| 2013/0076617 A1 | 3/2013 | Csaszar et al. |
| 2013/0082824 A1 | 4/2013 | Colley |
| 2013/0088431 A1 | 4/2013 | Ballagas et al. |
| 2013/0106766 A1 | 5/2013 | Yilmaz et al. |
| 2013/0135214 A1 | 5/2013 | Li et al. |
| 2013/0162554 A1 | 6/2013 | Lauder et al. |
| 2013/0172906 A1 | 7/2013 | Olson et al. |
| 2013/0191741 A1 | 7/2013 | Dickinson et al. |
| 2013/0217451 A1 | 8/2013 | Komiyama et al. |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228439 A1 | 9/2013 | Whitt, III |
| 2013/0229100 A1 | 9/2013 | Siddiqui |
| 2013/0229335 A1 | 9/2013 | Whitman |
| 2013/0229347 A1 | 9/2013 | Lutz, III |
| 2013/0229350 A1 | 9/2013 | Shaw |
| 2013/0229351 A1 | 9/2013 | Whitt, III |
| 2013/0229354 A1 | 9/2013 | Whitt, III et al. |
| 2013/0229363 A1 | 9/2013 | Whitman |
| 2013/0229366 A1 | 9/2013 | Dighde |
| 2013/0229380 A1 | 9/2013 | Lutz, III |
| 2013/0229534 A1 | 9/2013 | Panay |
| 2013/0229568 A1 | 9/2013 | Belesiu |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0300590 A1 | 11/2013 | Dietz |
| 2013/0301199 A1 | 11/2013 | Whitt |
| 2013/0301206 A1 | 11/2013 | Whitt |
| 2013/0304941 A1 | 11/2013 | Drasnin |
| 2013/0304944 A1 | 11/2013 | Young |
| 2013/0322000 A1 | 12/2013 | Whitt |
| 2013/0322001 A1 | 12/2013 | Whitt |
| 2013/0329360 A1 | 12/2013 | Aldana |
| 2013/0332628 A1 | 12/2013 | Panay |
| 2013/0339757 A1 | 12/2013 | Reddy |
| 2014/0012401 A1 | 1/2014 | Perek |
| 2014/0043275 A1 | 2/2014 | Whitman |
| 2014/0048399 A1 | 2/2014 | Whitt, III |
| 2014/0119802 A1 | 5/2014 | Shaw |
| 2014/0185215 A1 | 7/2014 | Whitt |
| 2014/0185220 A1 | 7/2014 | Whitt |
| 2014/0204514 A1 | 7/2014 | Whitt |
| 2014/0204515 A1 | 7/2014 | Whitt |
| 2014/0247546 A1 | 9/2014 | Whitt |
| 2014/0291134 A1 | 10/2014 | Whitt |
| 2014/0293534 A1 | 10/2014 | Siddiqui |
| 2014/0362506 A1 | 12/2014 | Whitt, III et al. |

FOREIGN PATENT DOCUMENTS

| | | |
|---|---|---|
| EP | 1223722 | 7/2002 |
| EP | 1480029 | 11/2004 |
| EP | 1591891 | 11/2005 |
| EP | 2026178 | 2/2009 |
| EP | 2353978 | 8/2011 |
| GB | 2123213 | 1/1984 |
| JP | 56108127 | 8/1981 |
| JP | 10326124 | 12/1998 |
| JP | 1173239 | 3/1999 |
| JP | 11338575 | 12/1999 |
| JP | 2000010654 | 1/2000 |
| JP | 2001142564 | 5/2001 |
| JP | 2004038950 | 2/2004 |
| JP | 2006163459 | 6/2006 |
| JP | 2006294361 | 10/2006 |
| JP | 2010244514 | 10/2010 |
| KR | 20010107055 | 12/2001 |
| KR | 20050014299 | 2/2005 |
| KR | 20060003093 | 1/2006 |
| KR | 20080006404 | 1/2008 |
| KR | 20090029411 | 3/2009 |
| KR | 20100022059 | 2/2010 |
| KR | 20100067366 | 6/2010 |
| KR | 20100115675 | 10/2010 |
| KR | 1020110087178 | 8/2011 |
| KR | 20110109791 | 10/2011 |
| KR | 20110120002 | 11/2011 |
| KR | 20110122333 | 11/2011 |
| KR | 101113530 | 2/2012 |
| WO | WO-9919995 | 4/1999 |
| WO | WO-2006044818 | 4/2006 |
| WO | WO-2007112172 | 10/2007 |
| WO | WO-2009034484 | 3/2009 |
| WO | WO-2011049609 | 4/2011 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

"Motion Sensors", *Android Developers*, retrieved from <http://developer.android.com/guide/topics/sensors/sensors_motion.html> on May 25, 2012, 7 pages.

"Position Sensors", *Android Developers*, retrieved from <http://developer.android.com/guide/topics/sensors/sensors_position.html> on May 25, 2012, 5 pages.

"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012,(2011), 4 pages.

"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.

Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Butler, Alex et al., "SideSight: Multi-"touch" Interaction around Small Devices", *In the proceedings of the 21st annual ACM sympo-*

(56) References Cited

OTHER PUBLICATIONS

*sium on User interface software and technology.*, retrieved from <http://research.microsoft.com/pubs/132534/sidesight_crv3.pdf> May 29, 2012,(Oct. 19, 2008), 4 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Dietz, Paul H., et al., "A Practical Pressure Sensitive Computer Keyboard", In Proceedings of UIST 2009,(Oct. 2009), 4 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Hanlon, Mike "ElekTex Smart Fabric Keyboard Goes Wireless", Retrieved from: <http://www.gizmag.com/go/5048/ > on May 7, 2012,(Jan. 15, 2006), 5 pages.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012), 15 pages.
Takamatsu, Seiichi et al., "Flexible Fabric Keyboard with Conductive Polymer-Coated Fibers", In Proceedings of Sensors 2011,(Oct. 28, 2011), 4 pages.
Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.
"Cirago Slim Case® —Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013),1 page.
"Non-Final Office Action", U.S. Appl. No. 13/471,001, (Feb. 19, 2013), 15 pages.
"Non-Final Office Action", U.S. Appl. No. 13/471,139, (Mar. 21, 2013), 12 pages.
"Non-Final Office Action", U.S. Appl. No. 13/471,202, (Feb. 11, 2013), 10 pages.
"Non-Final Office Action", U.S. Appl. No. 13/471,336, (Jan. 18, 2013), 14 pages.
"Non-Final Office Action", U.S. Appl. No. 13/651,195, (Jan. 2, 2013), 14 pages.
"Non-Final Office Action", U.S. Appl. No. 13/651,232, (Jan. 17, 2013), 15 pages.
"Non-Final Office Action", U.S. Appl. No. 13/651,272, (Feb. 12, 2013), 10 pages.
"Non-Final Office Action", U.S. Appl. No. 13/651,287, (Jan. 29, 2013), 13 pages.
"Non-Final Office Action", U.S. Appl. No. 13/651,304, (Mar. 22, 2013), 9 pages.
"Non-Final Office Action", U.S. Appl. No. 13/651,327, (Mar. 22, 2013), 6 pages.
"Non-Final Office Action", U.S. Appl. No. 13/651,871, (Mar. 18, 2013), 14 pages.
"Non-Final Office Action", U.S. Appl. No. 13/651,976, (Feb. 22, 2013), 16 pages.
"Non-Final Office Action", U.S. Appl. No. 13/653,321, (Feb. 1, 2013), 13 pages.
"Notice of Allowance", U.S. Appl. No. 13/470,633, (Mar. 22, 2013), 7 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013), 6 pages.
"The Microsoft Surface Tablets Comes with Impressive Design and Specs", Retrieved from <http://www.microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008), 11 Pages.
"What is Active Alignment?", http://www.kasalis.com/active_alignment.html, retrieved on Nov. 22, 2012, 2 Pages.
"Corrected Notice of Allowance", U.S. Appl. No. 13/470,633, (Apr. 9, 2013), 2 pages.
"Corrected Notice of Allowance", U.S. Appl. No. 13/470,633, (Jul. 2, 2013), 2 pages.
"Final Office Action", U.S. Appl. No. 13/471,001, (Jul. 25, 2013), 20 pages.
"Final Office Action", U.S. Appl. No. 13/651,195, (Apr. 18, 2013), 13 pages.
"Final Office Action", U.S. Appl. No. 13/651,232, (May 21, 2013), 21 pages.
"Final Office Action", U.S. Appl. No. 13/651,287, (May 3, 2013), 16 pages.
"Final Office Action", U.S. Appl. No. 13/651,976, (Jul. 25, 2013), 21 pages.
"Final Office Action", U.S. Appl. No. 13/653,321, (Aug. 2, 2013), 17 pages.
"Non-Final Office Action", U.S. Appl. No. 13/527,263, (Jul. 19, 2013), 5 pages.
"Non-Final Office Action", U.S. Appl. No. 13/563,435, (Jun. 14, 2013), 6 pages.
"Non-Final Office Action", U.S. Appl. No. 13/564,520, (Jun. 19, 2013), 8 pages.
"Non-Final Office Action", U.S. Appl. No. 13/565,124, (Jun. 17, 2013), 5 pages.
"Non-Final Office Action", U.S. Appl. No. 13/651,726, (Apr. 15, 2013), 6 pages.
"Non-Final Office Action", U.S. Appl. No. 13/651,871, (Jul. 1, 2013), 5 pages.
"Non-Final Office Action", U.S. Appl. No. 13/656,055, (Apr. 23, 2013), 11 pages.
"Notice of Allowance", U.S. Appl. No. 13/471,202, (May 28, 2013), 7 pages.
"Notice of Allowance", U.S. Appl. No. 13/651,195, (Jul. 8, 2013), 9 pages.
"Notice of Allowance", U.S. Appl. No. 13/651,272, (May 2, 2013), 7 pages.
"Notice of Allowance", U.S. Appl. No. 13/651,304, (Jul. 1, 2013), 5 pages.
"Notice of Allowance", U.S. Appl. No. 13/651,327, (Jun. 11, 2013), 7 pages.
"Notice of Allowance", U.S. Appl. No. 13/651,726, (May 31, 2013), 5 pages.
"PCT Search Report and Written Opinion", Application No. PCT/US2013/029461, (Jun. 21, 2013), 11 pages.
"PCT Search Report and Written Opinion", Application No. PCT/US2013/028948, (Jun. 21, 2013), 11 pages.
"Non-Final Office Action", U.S. Appl. No. 14/063,912, Jan. 2, 2014, 10 pages.

(56) References Cited

OTHER PUBLICATIONS

"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"Non-Final Office Action", U.S. Appl. No. 13/651,232, Dec. 5, 2013, 15 pages.
"Non-Final Office Action", U.S. Appl. No. 13/468,918, Dec. 26, 2013, 18 pages.
"Corrected Notice of Allowance", U.S. Appl. No. 13/563,435, Jan. 14, 2014, 2 pages.
"Corrected Notice of Allowance", U.S. Appl. No. 13/563,435, Jan. 22, 2014, 2 pages.
"Notice of Allowance", U.S. Appl. No. 13/653,321, Dec. 18, 2013, 41 pages.
"Foreign Office Action", Chinese Application No. 201320097066.8, Oct. 24, 2013, 5 Pages.
"Non-Final Office Action", U.S. Appl. No. 13/939,002, Dec. 20, 2013, 5 pages.
"Final Office Action", U.S. Appl. No. 13/939,032, Dec. 20, 2013, 5 pages.
"Restriction Requirement", U.S. Appl. No. 13/468,918, Nov. 29, 2013, 6 pages.
"Notice of Allowance", U.S. Appl. No. 13/565,124, Dec. 24, 2013, 6 pages.
"Final Office Action", U.S. Appl. No. 13/564,520, Jan. 15, 2014, 7 pages.
"Advanced Configuration and Power Management Specification", *Intel Corporation, Microsoft Corporation, Toshiba Corp. Revision 1*, (Dec. 22, 1996), 364 pages.
"Corrected Notice of Allowance", U.S. Appl. No. 13/651,327, (Sep. 12, 2013), 2 pages.
"Corrected Notice of Allowance", U.S. Appl. No. 13/651,327, (Sep. 23, 2013), 2 pages.
"Corrected Notice of Allowance", U.S. Appl. No. 13/651,726, (Sep. 17, 2013), 2 pages.
"Final Office Action", U.S. Appl. No. 13/471,139, (Sep. 16, 2013), 13 pages.
"Final Office Action", U.S. Appl. No. 13/471,336, (Aug. 28, 2013), 18 pages.
"Final Office Action", U.S. Appl. No. 13/656,055, (Oct. 23, 2013), 14 pages.
"Final Office Action", U.S. Appl. No. 13/938,930, (Nov. 8, 2013), 10 pages.
"Final Office Action", U.S. Appl. No. 13/939,002, (Nov. 8, 2013), 7 pages.
"International Search Report and Written Opinion", Application No. PCT/US2013/040968, (Sep. 5, 2013), 12 pages.
"International Search Report and Written Opinion", Application No. PCT/US2013/042550, (Sep. 24, 2013), 14 pages.
"Non-Final Office Action", U.S. Appl. No. 13/780,228, (Oct. 30, 2013), 12 pages.
"Non-Final Office Action", U.S. Appl. No. 13/938,930, (Aug. 29, 2013), 9 pages.
"Non-Final Office Action", U.S. Appl. No. 13/939,002, (Aug. 28, 2013), 6 pages.
"Non-Final Office Action", U.S. Appl. No. 13/939,032, (Aug. 29, 2013), 7 pages.
"Notice of Allowance", U.S. Appl. No. 13/563,435, (Nov. 12, 2013), 5 pages.
"Notice of Allowance", U.S. Appl. No. 13/651,871, (Oct. 2, 2013), 7 pages.
"Notice to Grant", CN Application No. 201320097089.9, (Sep. 29, 2013), 2 Pages.
"Notice to Grant", CN Application No. 201320097124.7, (Oct. 8, 2013), 2 pages.
"Welcome to Windows 7", Retrieved from: <http://www.microsoft.com/en-us/download/confirmation.aspx?id=4984> on Aug. 1, 2013, (Sep. 16, 2009), 3 pages.
Prospero, Michael "Samsung Outs Series 5 Hybrid PC Tablet", Retrieved from: <http://blog.laptopmag.com/samsung-outs-series-5-hybrid-pc-tablet-running-windows-8>on Oct. 31, 2013, (Jun. 4, 2012), 7 pages.
"Advisory Action", U.S. Appl. No. 13/939,032, Feb. 24, 2014, 2 pages.
"Corrected Notice of Allowance", U.S. Appl. No. 13/563,435, Mar. 20, 2014, 2 pages.
"Corrected Notice of Allowance", U.S. Appl. No. 13/565,124, Apr. 3, 2014, 4 pages.
"Corrected Notice of Allowance", U.S. Appl. No. 13/565,124, Mar. 10, 2014, 2 pages.
"Corrected Notice of Allowance", U.S. Appl. No. 13/565,124, Apr. 14, 2014, 2 pages.
"Corrected Notice of Allowance", U.S. Appl. No. 13/938,930, May 6, 2014, 2 pages.
"Corrected Notice of Allowance", U.S. Appl. No. 13/939,002, May 22, 2014, 2 pages.
"Corrected Notice of Allowance", U.S. Appl. No. 13/939,002, May 5, 2014, 2 pages.
"Final Office Action", U.S. Appl. No. 13/780,228, 03/28/14, 13 pages.
"Final Office Action", U.S. Appl. No. 13/780,228, Mar. 28, 2014, 13 pages.
"Final Office Action", U.S. Appl. No. 14/063,912, Apr. 29, 2014, 10 pages.
"Final Office Action", U.S. Appl. No. 14/199,924, May 6, 2014, 5 pages.
"Foreign Office Action", CN Application No. 201320328022.1, Feb. 17, 2014, 4 Pages.
"Foreign Office Action", CN Application No. 201320328022.1, Oct. 18, 2013, 3 Pages.
"Non-Final Office Action", U.S. Appl. No. 13/599,635, Feb. 25, 2014, 13 pages.
"Non-Final Office Action", U.S. Appl. No. 13/471,030, May 15, 2014, 10 pages.
"Non-Final Office Action", U.S. Appl. No. 13/471,186, Feb. 27, 2014, 8 pages.
"Non-Final Office Action", U.S. Appl. No. 13/471,237, Mar. 24, 2014, 7 pages.
"Non-Final Office Action", U.S. Appl. No. 13/471,336, May 7, 2014, 17 pages.
"Non-Final Office Action", U.S. Appl. No. 13/471,376, Apr. 2, 2014, 17 pages.
"Non-Final Office Action", U.S. Appl. No. 13/471,405, Feb. 20, 2014, 37 pages.
"Non-Final Office Action", U.S. Appl. No. 13/492,232, Apr. 30, 2014, 9 pages.
"Non-Final Office Action", U.S. Appl. No. 13/527,263, Apr. 3, 2014, 6 pages.
"Non-Final Office Action", U.S. Appl. No. 13/564,520, Feb. 14, 2014, 5 pages.
"Non-Final Office Action", U.S. Appl. No. 13/645,405, Jan. 31, 2014, 6 pages.
"Non-Final Office Action", U.S. Appl. No. 13/656,055, Mar. 12, 2014, 17 pages.
"Non-Final Office Action", U.S. Appl. No. 14/199,924, Apr. 10, 2014, 6 pages.
"Non-Final Office Action", U.S. Appl. No. 14/200,595, 04/11/14, 4 pages.
"Notice of Allowance", U.S. Appl. No. 13/471,139, Mar. 17, 2014, 4 pages.
"Notice of Allowance", U.S. Appl. No. 13/471,237, May 12, 2014, 8 pages.
"Notice of Allowance", U.S. Appl. No. 13/651,232, Apr. 25, 2014, 9 pages.
"Notice of Allowance", U.S. Appl. No. 13/651,287, May 2, 2014, 6 pages.
"Notice of Allowance", U.S. Appl. No. 13/938,930, Feb. 20, 2014, 4 pages.
"Notice of Allowance", U.S. Appl. No. 13/939,002, Mar. 3, 2014, 4 pages.

(56) References Cited

OTHER PUBLICATIONS

"Notice of Allowance", U.S. Appl. No. 13/939,032, Apr. 3, 2014, 4 pages.

"Notice of Allowance", U.S. Appl. No. 14/018,286, May 23, 2014, 8 pages.

"Supplemental Notice of Allowance", U.S. Appl. No. 13/653,321, Mar. 28, 2014, 4 pages.

"International Search Report and Written Opinion", Application No. PCT/US2014/031531, Jun. 20, 2014, 10 Pages.

"Non-Final Office Action", U.S. Appl. No. 13/468,949, Jun. 20, 2014, 10 pages.

"International Search Report and Written Opinion", Application No. PCT/US2013/028483, Jun. 24, 2014, 10 pages.

"International Search Report and Written Opinion", Application No. PCT/US2013/028484, Jun. 24, 2014, 10 pages.

"International Search Report and Written Opinion", Application No. PCT/US2013/028485, Jun. 25, 2014, 10 pages.

"International Search Report and Written Opinion", Application No. PCT/US2013/028769, Jun. 26, 2014, 10 pages.

"International Search Report and Written Opinion", Application No. PCT/US2013/028771, Jun. 19, 2014, 10 pages.

"International Search Report and Written Opinion", Application No. PCT/US2013/028486, Jun. 20, 2014, 10 pages.

"International Search Report and Written Opinion", Application No. PCT/US2013/041017, Jul. 17, 2014, 10 pages.

"International Search Report and Written Opinion", Application No. PCT/US2013/028489, Jun. 20, 2014, 11 pages.

"International Search Report and Written Opinion", Application No. PCT/US2013/028488, Jun. 24, 2014, 11 pages.

"International Search Report and Written Opinion", Application No. PCT/US2013/028767, Jun. 24, 2014, 11 pages.

"International Search Report and Written Opinion", Application No. PCT/US2013/028481, Jun. 19, 2014, 11 pages.

"Advisory Action", Application No. 14/199,924, May 28, 2014, 2 pages.

"Corrected Notice of Allowance", U.S. Appl. No. 13/651,232, Jul. 31, 2014, 2 pages.

"Corrected Notice of Allowance", U.S. Appl. No. 13/651,287, Aug. 21, 2014, 2 pages.

"Corrected Notice of Allowance", U.S. Appl. No. 13/938,930, Jun. 6, 2014, 2 pages.

"Corrected Notice of Allowance", U.S. Appl. No. 13/939,002, Jun. 19, 2014, 2 pages.

"Corrected Notice of Allowance", U.S. Appl. No. 13/939,032, Jun. 26, 2014, 2 pages.

"Corrected Notice of Allowance", U.S. Appl. No. 13/939,032, Jul. 15, 2014, 2 pages.

"Final Office Action", U.S. Appl. No. 13/471,376, Aug. 18, 2014, 24 pages.

"Final Office Action", U.S. Appl. No. 13/595,700, Aug. 15, 2014, 6 pages.

"Final Office Action", U.S. Appl. No. 13/599,635, Aug. 8, 2014, 16 pages.

"International Search Report and Written Opinion", Application No. PCT/US2013/028490, Jun. 24, 2014, 11 pages.

"International Search Report and Written Opinion", Application No. PCT/US2013/028766, Jun. 26, 2014, 11 pages.

"International Search Report and Written Opinion", Application No. PCT/US2013/028772, Jun. 30, 2014, 11 pages.

"International Search Report and Written Opinion", Application No. PCT/US2013/028768, Jun. 24, 2014, 12 pages.

"International Search Report and Written Opinion", Application No. PCT/US2013/028482, Jun. 20, 2014, 13 pages.

"International Search Report and Written Opinion", Application No. PCT/US2013/028487, May 27, 2014, 9 pages.

"International Search Report and Written Opinion", Application No. PCT/US2013/028770, Jun. 26, 2014, 9 pages.

"Non-Final Office Action", U.S. Appl. No. 13/468,882, Jul. 9, 2014, 9 pages.

"Non-Final Office Action", U.S. Appl. No. 13/470,951, Jul. 2, 2014, 19 pages.

"Non-Final Office Action", U.S. Appl. No. 13/471,001, Jun. 17, 2014, 23 pages.

"Non-Final Office Action", U.S. Appl. No. 13/471,054, Jun. 3, 2014, 15 pages.

"Non-Final Office Action", U.S. Appl. No. 13/471,412, Jul. 11, 2014, 22 pages.

"Non-Final Office Action", U.S. Appl. No. 13/564,520, Jun. 16, 2014, 5 pages.

"Non-Final Office Action", U.S. Appl. No. 13/595,700, Jun. 18, 2014, 8 pages.

"Non-Final Office Action", U.S. Appl. No. 13/645,405, Aug. 11, 2014, 5 pages.

"Non-Final Office Action", U.S. Appl. No. 13/651,976, Jun. 16, 2014, 23 pages.

"Non-Final Office Action", U.S. Appl. No. 14/225,250, Jun. 17, 2014, 5 pages.

"Non-Final Office Action", U.S. Appl. No. 14/225,276, Jun. 13, 2014, 6 pages.

"Non-Final Office Action", U.S. Appl. No. 14/277,240, Jun. 13, 2014, 6 pages.

"Notice of Allowance", U.S. Appl. No. 13/468,918, Jun. 17, 2014, 5 pages.

"Notice of Allowance", U.S. Appl. No. 13/471,186, Jul. 3, 2014, 7 pages.

"Notice of Allowance", U.S. Appl. No. 13/471,405, Jun. 24, 2014, 9 pages.

"Notice of Allowance", U.S. Appl. No. 14/199,924, Jun. 10, 2014, 4 pages.

"Restriction Requirement", U.S. Appl. No. 13/595,700, May 28, 2014, 6 pages.

"Supplemental Notice of Allowance", U.S. Appl. No. 14/018,286, Jun. 11, 2014, 5 pages.

"Corrected Notice of Allowance", U.S. Appl. No. 13/471,030, Sep. 30, 2014, 2 pages.

"Corrected Notice of Allowance", U.S. Appl. No. 14/199,924, Aug. 29, 2014, 2 pages.

"Corrected Notice of Allowance", U.S. Appl. No. 14/199,924, Sep. 5, 2014, 2 pages.

"Corrected Notice of Allowance", U.S. Appl. No. 14/199,924, Sep. 19, 2014, 2 pages.

"Final Office Action", U.S. Appl. No. 13/468,949, Oct. 6, 2014, 11 pages.

"Final Office Action", U.S. Appl. No. 13/471,054, Oct. 23, 2014, 17 pages.

"Final Office Action", U.S. Appl. No. 13/471,336, Oct. 6, 2014, 13 pages.

"Final Office Action", U.S. Appl. No. 13/492,232, Nov. 17, 2014, 13 pages.

"Final Office Action", U.S. Appl. No. 13/595,700, Oct. 9, 2014, 8 pages.

"Final Office Action", U.S. Appl. No. 13/656,055, Sep. 17, 2014, 10 pages.

"Final Office Action", U.S. Appl. No. 14/200,595, Nov. 19, 2014, 5 pages.

"International Search Report and Written Opinion", Application No. PCT/US2014/043546, Oct. 9, 2014, 10 pages.

"Non-Final Office Action", U.S. Appl. No. 13/471,282, Sep. 3, 2014, 13 pages.

"Non-Final Office Action", U.S. Appl. No. 13/471,393, Oct. 20, 2014, 12 pages.

"Non-Final Office Action", U.S. Appl. No. 13/780,228, Sep. 15, 2014, 18 pages.

"Non-Final Office Action", U.S. Appl. No. 14/063,912, Sep. 2, 2014, 11 pages.

"Notice of Allowance", U.S. Appl. No. 13/471,030, Sep. 5, 2014, 6 pages.

"Notice of Allowance", U.S. Appl. No. 14/277,240, Sep. 16, 2014, 4 pages.

(56) References Cited

OTHER PUBLICATIONS

"Supplemental Notice of Allowance", U.S. Appl. No. 13/471,405, Aug. 29, 2014, 5 pages.

Harrison, "UIST 2009 Student Innovation Contest—Demo Video", Retrieved From: <https://www.youtube.com/watch?v=PD18eYIASf0> Sep. 16, 2014, Jul. 23, 2009, 1 pages.

"Final Office Action", U.S. Appl. No. 13/471,412, Dec. 15, 2014, 11 pages.

"Final Office Action", U.S. Appl. No. 14/225,276, Dec. 17, 2014, 6 pages.

"Non-Final Office Action", U.S. Appl. No. 13/525,614, Nov. 24, 2014, 19 pages.

"Restriction Requirement", U.S. Appl. No. 14/147,252, Dec. 1, 2014, 6 pages.

"Supplemental Notice of Allowance", U.S. Appl. No. 13/471,405, Dec. 17, 2014, 5 pages.

\* cited by examiner

ACCESSORY DEVICE ARCHITECTURE

RELATED APPLICATIONS

This application is a continuation of and claims priority to U.S. patent application Ser. No. 13/527,263, filed Jun. 19, 2012, entitled "Accessory Device Architecture" and further claims priority under 35 U.S.C. Section 119(e) to U.S. Provisional Patent Application No. 61/646,799, filed May 14, 2012, the disclosure of which is hereby incorporated by reference in its entirety, this application also incorporates the following applications by reference in their entirety: U.S. patent application Ser. No. 13/470,633, filed May 14, 2012, and titled "Flexible Hinge and Removable Attachment;" and U.S. patent application Ser. No. 13/471,186, filed May 14, 2012, and titled "Input Device Layers and Nesting."

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

However, conventional techniques that are made available to mobile computing devices to connect accessory devices may consume significant amounts of power, which may hinder the mobility of the device. Further, these conventional techniques could in some instances involve a complicated process by which the accessory device is recognized by the computing device, which could interfere with a user's experience with the device.

SUMMARY

An accessory device architecture is described. In one or more implementations, data is received from an accessory device at an intermediate processor of a computing device, the data usable to enumerate functionality of the accessory device for operation as part of a computing device that includes the intermediate processor. The data is passed by the intermediate processor to an operating system executed on processor of the computing device to enumerate the functionality of the accessory device as part of the intermediate processor.

In one or more implementations, an intermediate processor comprises one or more integrated circuits configured to receive a human interface device descriptor from an accessory device via an interface that supports removable physical and communicative coupling to the accessory device and communicate the human interface device descriptor to a processor that is configured to execute an operating system such that the operating system is made aware of functionality of the accessory device as described in the human interface device descriptor.

In one or more implementations, a computing device includes an interface configured to support a removable communicative coupling with an accessory device, a processor configured to execute an operating system, and an intermediate processor communicatively coupled to the interface and the processor, the intermediate processor configured to support a pass through mode in which human interface device reports received by the intermediate processor from the accessory device via the interface are passed to the operating system without modification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
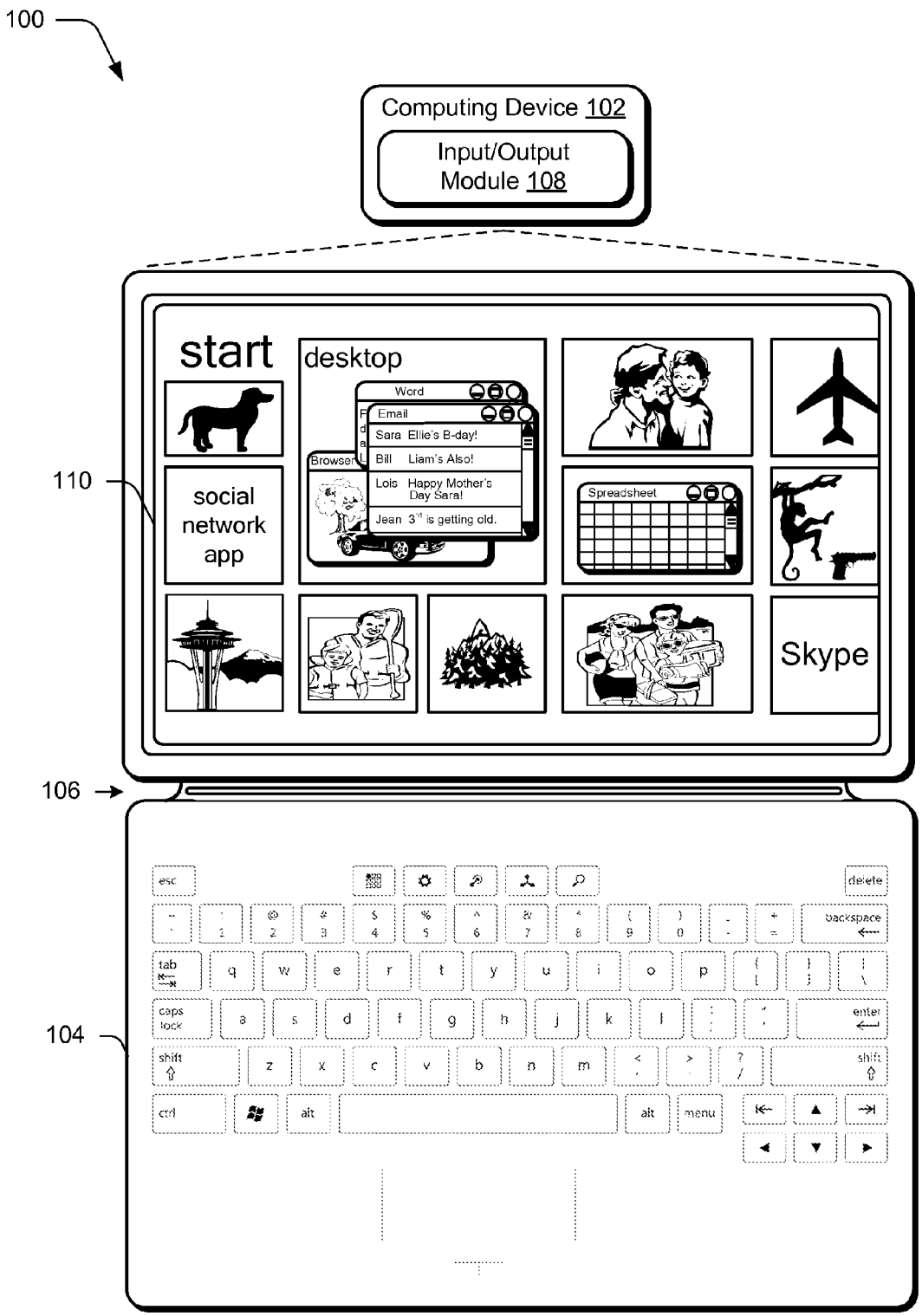
FIG. 1 is an illustration of an environment in an example implementation that is operable to employ the techniques described herein.

Conventional techniques were developed to allow users to simply attach accessory devices for interaction with a computing device, such as input devices, storage devices, peripheral devices, and so on. However, these conventional techniques could consume significant amounts of power. Consequently, additional techniques were developed to address these shortcomings, but these techniques could limit functionality that was made available to the accessory device, could result in increased resource utilization on the part of the computing device to interact with the accessory device, and so on.

Techniques are described that involve accessory device architectures. In one or more implementations, an architecture may be configured to employ an intermediate processor that is disposed between a processor of the computing device and functionality of the accessory device, e.g., a controller of the accessory device. The intermediate processor may be configured to reduce power consumption of the computing device, such as to permit operation of sensors without waking the processor of the computing device that executes the operating system and so on.

In order to promote flexibility of the architecture, the intermediate processor may support a pass through mode in which data is passed between the accessory device and the operating system without modification by the intermediate processor. In this way, the intermediate processor may support functionality of a wide range of accessory devices without performing updates to firmware of the intermediate processor.

The architecture may also be configured to support techniques to enumerate the accessory device in a manner that mimics plug-and-play functionality without encountering the drawbacks of conventional techniques, such as power consumption as described above. This may be performed by utilizing a communication technique that consumes less power (e.g., through clocking, lower power consumption when operational, and so on) than conventional techniques, although these techniques may also be support in other implementations. This communication technique may further be configured through the architecture to support human interface device (HID) reports such that functionality of the accessory interface device may be enumerated (e.g., via an HID table) to support a consistent technique in which accessory devices having different functionality may interact with the computing device. In this way, an operating system may be made aware of functionality of the accessory device without drawbacks of conventional transport techniques. Further description of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the techniques described herein. The illustrated environment 100 includes an example of a computing device 102 that is physically and communicatively coupled to an accessory device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the accessory device 104, keys of a virtual keyboard displayed by the display device 110 to identify gestures and cause operations to be performed that correspond to the gestures that may be recognized through the accessory device 104 and/or touchscreen functionality of the display device 110, and so forth. Other input devices are also contemplated, such as a mouse, track pad, camera to detect gestures, and so on. Thus, the input/output module 108 may support a variety of different input techniques by recognizing and leveraging a division between types of inputs including key presses, gestures, and so on.

In the illustrated example, the accessory device 104 is configured as a keyboard having a QWERTY arrangement of keys although other arrangements are also contemplated, such as storage devices, peripheral devices, output devices, and so on. Further, other non-conventional configurations are also contemplated, such as a game controller, configuration to mimic a musical instrument, and so forth. Thus, the accessory device 104 and keys incorporated by the accessory device 104 may assume a variety of different configurations to support a variety of different functionality.

As previously described, the accessory device 104 is physically and communicatively coupled to the computing device 102 in this example through use of a flexible hinge 106, although other examples are also contemplated such as a wireless connection. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device 104 in relation to the computing device 102. This may be used to support consistent alignment of the accessory device 104 in relation to the computing device 102, such as to align sensors used to change power states, application states, and so on.

The flexible hinge 106, for instance, may be formed using one or more layers of fabric and include conductors formed as flexible traces to communicatively couple the accessory device 104 to the computing device 102 and vice versa. This communication, for instance, may be used to communicate a result of a key press to the computing device 102, receive power from the computing device, perform authentication, provide supplemental power to the computing device 102, and so on.

Figure 2:
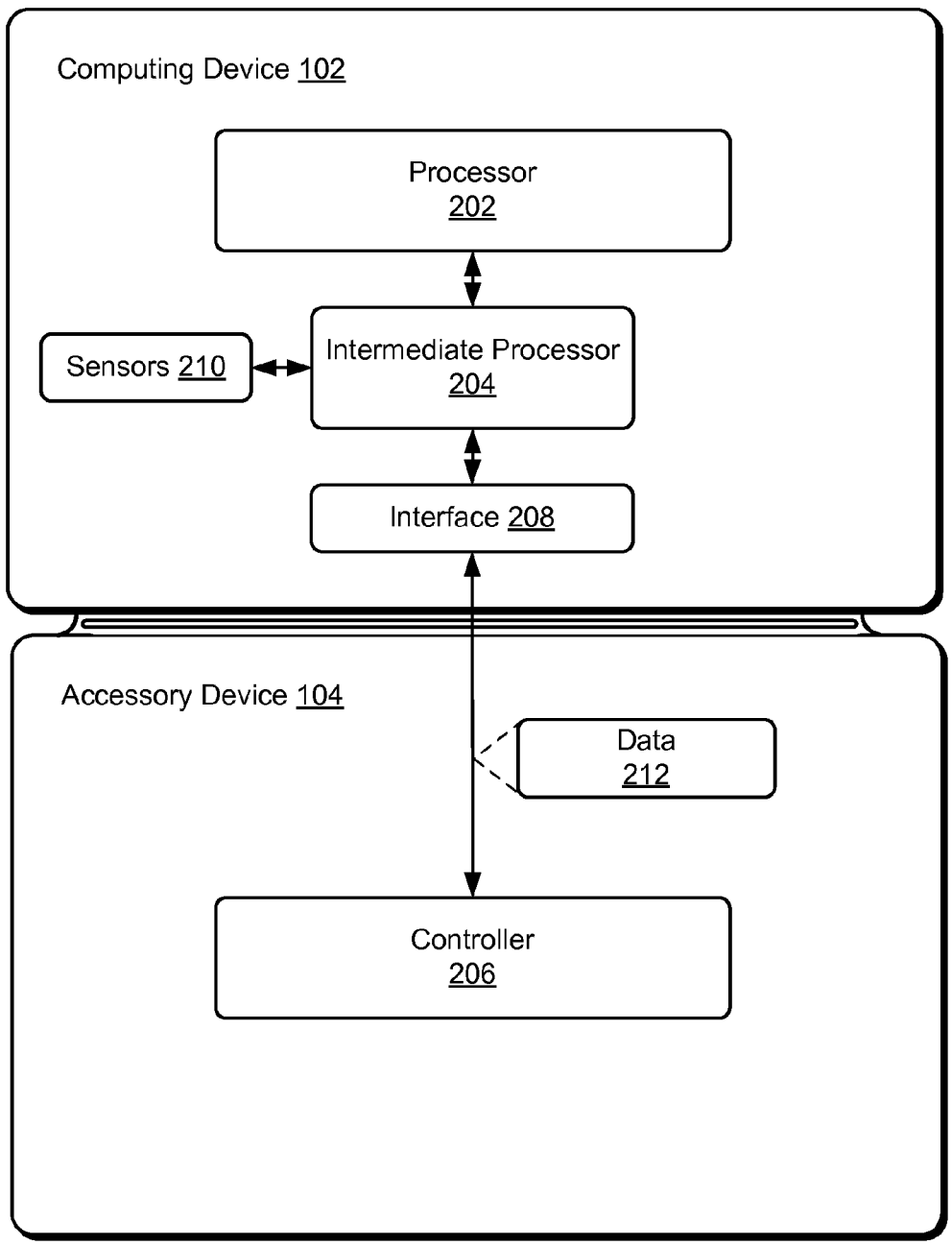
FIG. 2 is an illustration of an example implementation showing an architecture employable by a computing device and accessory device of FIG. 1.

FIG. 2 depicts an example implementation showing an architecture 200 employable by the computing device 102 and the accessory device 104 of FIG. 1. The illustrated architecture 200 includes a processor 202 and an intermediate processor 204 of a computing device 102 that is communicatively coupled to a controller 206 of the accessory device via an interface 208. The processor 202 may be configured to provide primary processing resources of the computing device 102, such as to execute an operating system, applications, and other software of the computing device 102. Consequently, the processor 202 may consume significant amounts of power, relatively, when in an active state as opposed to a sleep state.

In order to reduce power consumed by the processor 202, the architecture 200 may employ an intermediate processor 204. The intermediate processor 204 may be configured to provide a variety of different functionality, such as to provide functionality while the processor 202 is in a sleep state. This functionality, for instance, may include communication with one or more sensors 210 of the computing device 102 without communication through the processor 202. The intermediate processor 204 may leverage this communication to support waking of the accessory device 104, processor 202, and so on. Thus, these components and devices may remain in a sleep state until a determination is made by the intermediate processor 204 to "wake" these components and devices, thereby conserving power. A variety of other examples are also contemplated without departing from the spirit and scope thereof.

In one or more implementations, the intermediate processor 204 is enumerated to an operating system executed on the processor 202 and thus is "viewable" by the operating system. The intermediate processor 204 may also be configured to communicate with the accessory device 104, e.g., a controller 206, through an interface 208. The accessory device 104, for instance, may be removably physically coupled to the interface 208 of the computing device 102, which may be used to support a communicative coupling such that data 212 may be communicated between the computing device 102 and the accessory device 104. The transport mechanism (e.g., the communicative coupling) and data 212 communicated via this transport mechanism may take a variety of different configurations, an example of which is shown in relation to FIG. 3.

Figure 3:
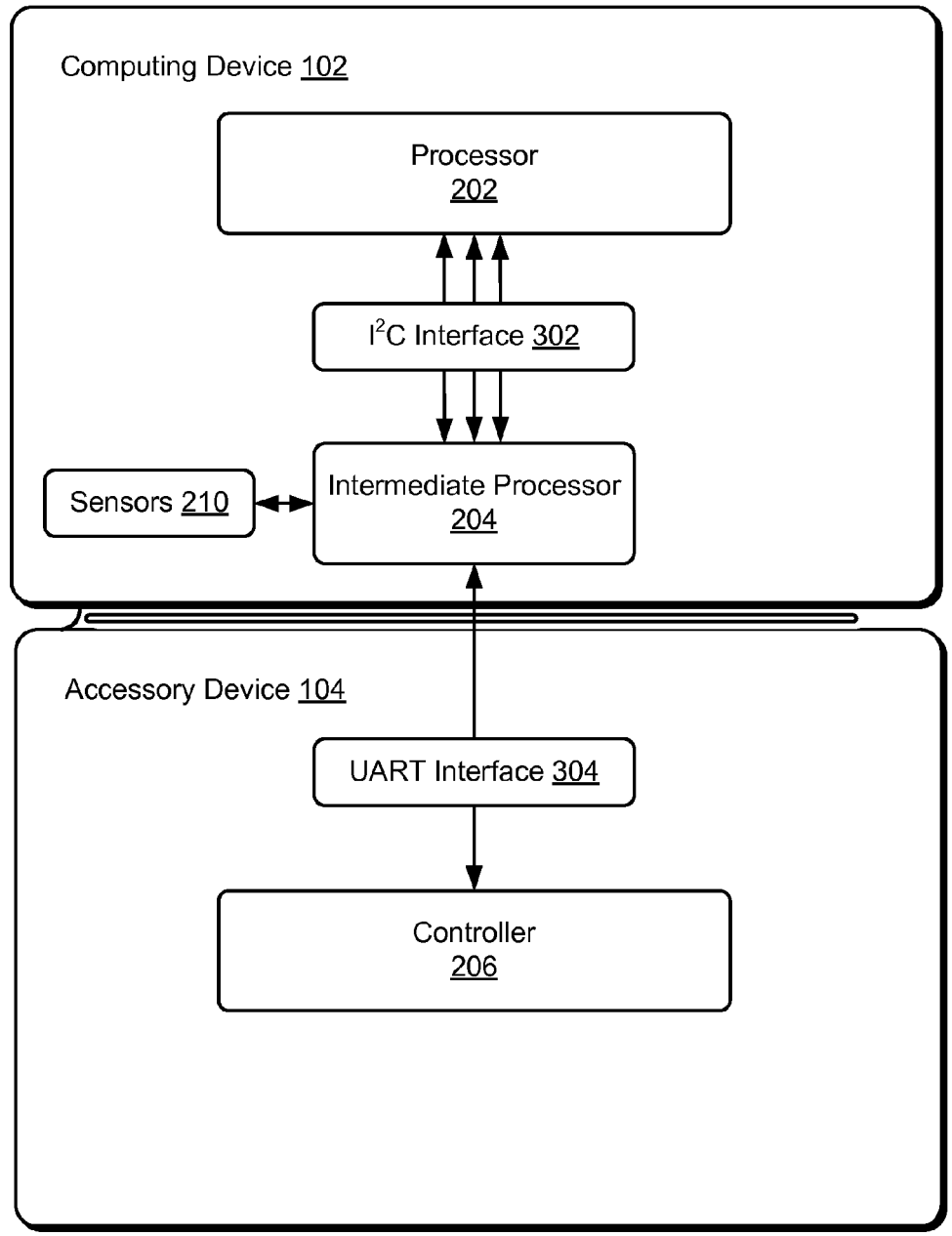
FIG. 3 is an example implementation of an architecture showing a transport mechanism to support a communicative coupling in greater detail.

FIG. 3 is an example implementation of an architecture 300 showing a transport mechanism to support a communicative coupling in greater detail. In the illustrated example, the architecture 300 employs a transport mechanism that is configured to consume less power than conventional transport mechanisms. An example of such a mechanism is an $I^2C$ interface 302 (i.e., Inter-Integrated Circuit), which may be configured to consume less power than conventional transport mechanisms. For example, the $I^2C$ interface 302 may be configured as a transport mechanism that consumes 1.8 volts versus 5 volts and over in conventional mechanisms. This $I^2C$ interface 302 may also be configured to reduce power consumption through clocking, in which the mechanism is clocked when actively engaged in transport but is not otherwise as opposed to conventional techniques in which clocking is performed continuously. Other examples are also contemplated, such as to support clock stretching.

In the illustrated example, the $I^2C$ interface 302 is implemented using three wires or less, which include two data communication lines and a ground to support communication between the processor 202 and intermediate processor 204. This simplifies implementation of this transport mechanism as opposed to conventional transport mechanisms, thereby reducing manufacturing and assembly processes and reducing costs. A UART interface 304 is shown as communicatively coupling the intermediate processor 204 to the controller 206. Other transport mechanisms are also contemplated without departing from the spirit and scope thereof which may consume higher or lower amounts of power. Naturally, a variety of other implementations are also contemplated which may incorporate similar functionality. Regardless of a transport mechanism utilized, data communicated via the mechanism may be configured in a variety of different ways, an example of which is described in relation to the following figure.

Figure 4:
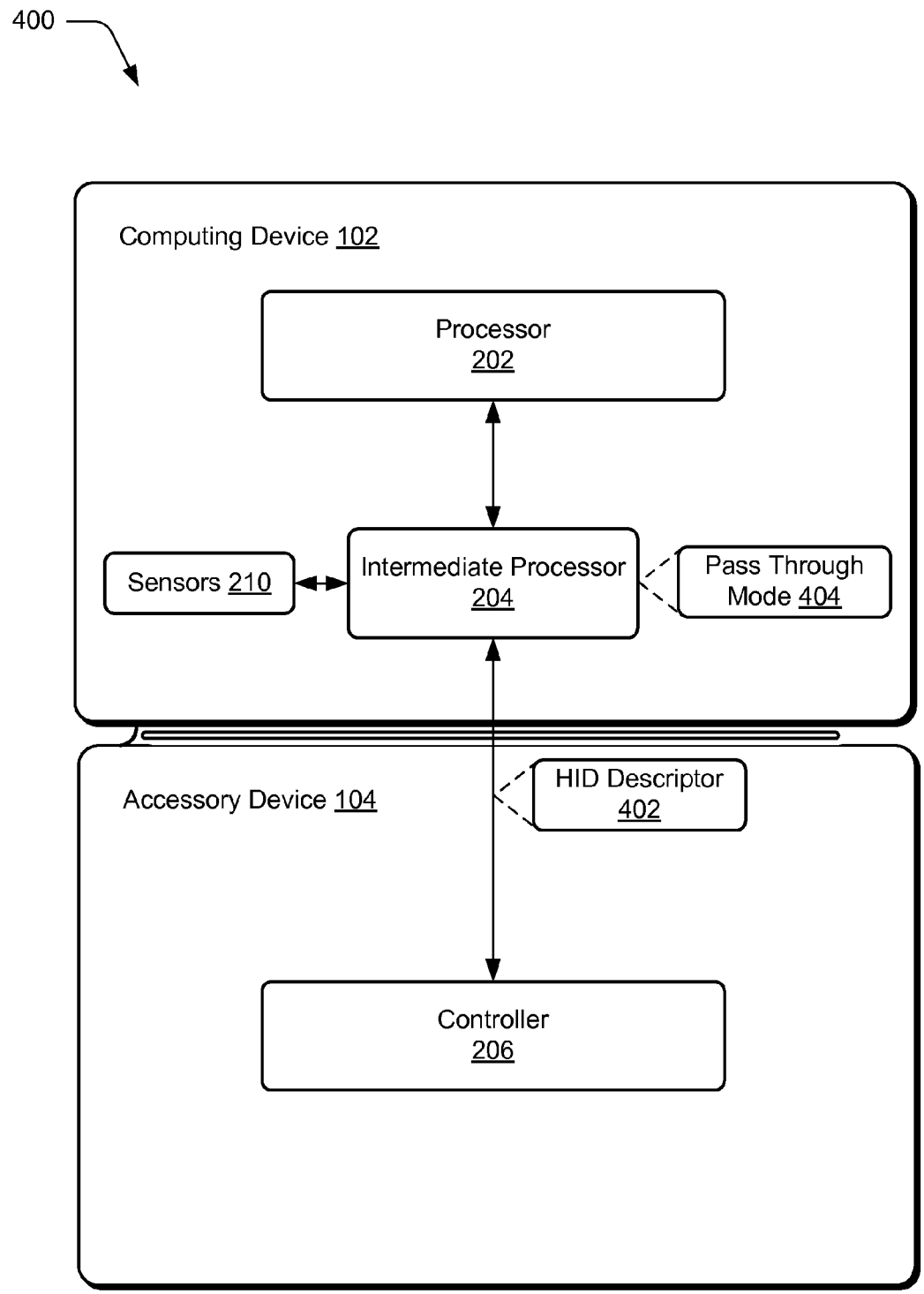
FIG. 4 is an example implementation of an architecture showing a configuration of data of FIG. 2 as in compliance with human interface device formats transported via the transport mechanism of FIG. 3.

FIG. 4 is an example implementation of an architecture 400 showing a configuration of data of FIG. 2 as in compliance with human interface device formats transported via a transport mechanism. Data communicated between the accessory device 104 and the computing device 102 may be configured in a variety of ways to support a variety of functionality. In the illustrated example, the data 208 is configured in accordance with human interface device formats to enumerate, denumerate, and other permit communication between the accessory device 104 and the computing device 102 over $I^2C$ interface 302, although other interfaces are also contemplated.

For example, the controller 206 of the accessory device 104 may "talk" with the processor 202 through the intermediate processor 204 using $I^2C$ as previously described. This may make it appear that the accessory device 104 is communicatively connected to the processor 202. For instance, from an operating system's point of view that is executed on the processor 202, the enumeration and denumeration of the accessory device 104 may be performed as if the accessory device 104 was physically connected to the processor 202, even though it is not.

Human interface device (HID) references a type of communication that may support bidirectional communication between the accessory device 104 and the computing device 102. HID may be implemented as a self-describing protocol in which packages communicated between the devices may include a variety of different data types and formats, which may be described as part of the communication.

An HID descriptor 402, for instance, may be communicated from the controller 206 of the accessory device 104 it the computing device 102. The HID descriptor 402 may be configured as an array of bytes that describes data packets that are to be communicated between the accessory device 104 and the computing device 102. For example, the HID descriptors 402 may describe functionality that is supported by the accessory device 104 and how interaction with that functionality is to be performed. The HID descriptor 402 may then be parsed by the computing device 102 (e.g., through execution of an operating system) to determine how to interpret data received from the accessory device 104 as well as how to communicate with the accessory device 104.

For example, the HID descriptors 402 may be configured as device descriptors or report descriptors that are stored in firmware of the device. A report descriptor is information describing a format of data that the accessory device 104 is to send to the computing device as well as data that may be sent to the accessory device 104. A device descriptor is information describing functionality available from the accessory device 104, such as input functionality and types (e.g., keys, mouse), and so forth.

Thus, these types of descriptors may be used to report the type of device it is, version information, vendor identifier, product identifier, and other information that is usable by the computing device 102, and more particularly an operating system of the computing device 102, to enumerate and denumerate the device as if it were inherently a plug and play device. Data may then be communicated between the devices (e.g., in the form of HID reports) in accordance with the descriptors, such as in response to inputs, from sensors 210 through the intermediate processor 204 to the controller 206 of the accessory device 104, and so on. Thus, the reports may describe inputs initiated by the accessory device 104, as well as data originating from the computing device 102 to be communicated to the accessory device 104.

The intermediate processor 204 may be configured to support a pass through mode 404 in which data received by the intermediate processor 204 from the controller 206 of the accessory device 104 is passed to the processor 202 without modification. In this way, the intermediate processor 204 may be configured to address a variety of different accessory devices 104, even devices having functionality that will be made available in the future, without updating the intermediate processor 204.

For example, HID reports (e.g., HID mouse report and HID keyboard report) are passed from the accessory device 104 through the intermediate processor 204 to the processor 202 in the pass through mode 404. Reports from the accessory device 104 may be packaged in such a way as to be consumable by the computing device 102 without additional modification by the intermediate processor 204. This provides support of future accessory devices without a firmware modification to the intermediate processor 204 each time a new accessory device is released. Also, this provides a standard specification by which future accessory devices pass information to the host.

The intermediate processor 204 may be configured to support a variety of other functionality. For example, the accessory device 104 may not able to manage its own power without information from the intermediate processor 204. Because of this, the intermediate processor 204 may be implemented to manage power of the accessory device 104. In another example, the accessory device 104 and the intermediate processor 204 may manage power using interfaces. The accessory device 104, for instance, may register with the intermediate processor 204.

This registration may be performed to cause reports to be sent from the intermediate processor 204 to the controller 206 of the accessory device 104. The reports, for instance, may include values from the sensors 210, such as when values of an accelerometer change by a certain level (e.g., above a threshold) in a defined amount of time. This alleviates the intermediate processor 204 from managing the power of each accessory device and is a cleaner solution in instances in which the accessory device 104 has increased knowledge on how to manage its own power. A variety of other examples are also contemplated, such as to report status that is used by the accessory device 104 to determine what power state in which to place the accessory device 104.

Example Procedure

The following discussion describes accessory device architecture techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
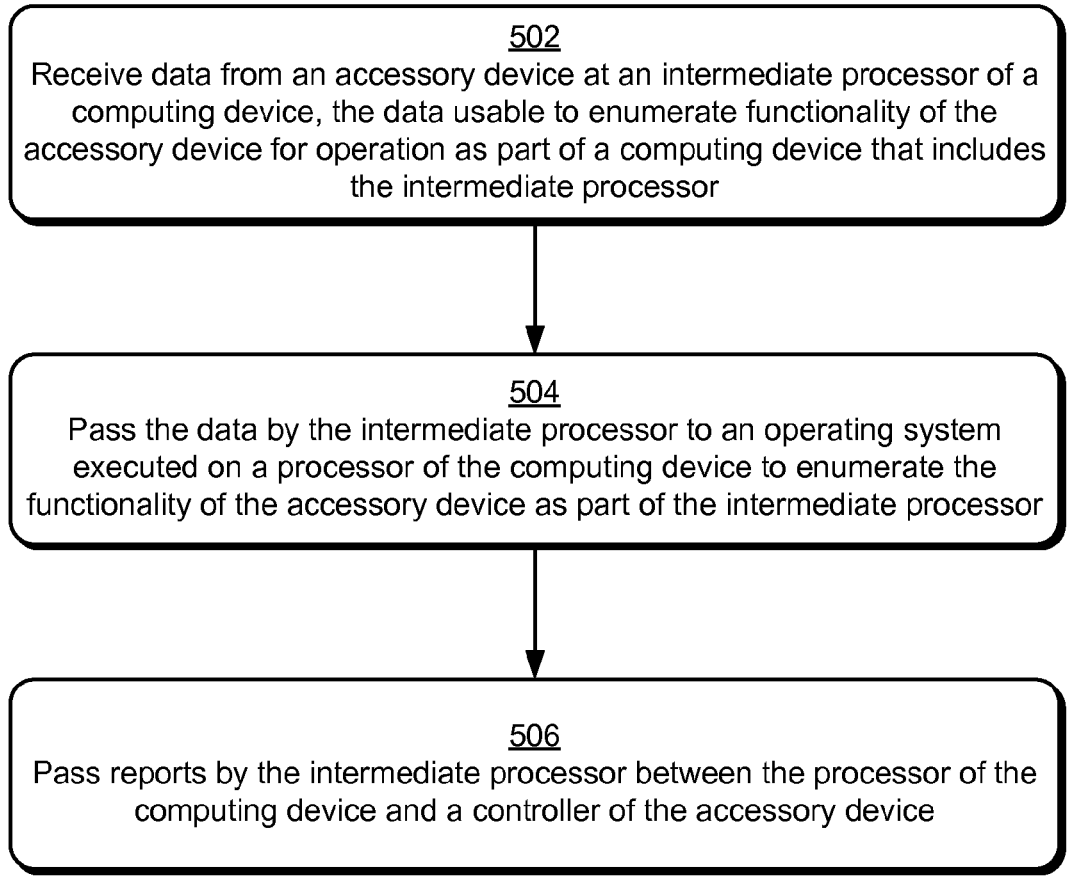
FIG. 5 is a flow diagram depicting a procedure in an example implementation in which HID descriptors and HID reports are communicated using a pass through mode by a intermediate processor between a processor of a computing device and an accessory device.

FIG. 5 depicts a procedure 500 in an example implementation in which HID descriptors and HID reports are communicated using a pass through mode by an intermediate processor between a processor of a computing device and an accessory device. Data is received from an accessory device at an intermediate processor of a computing device, the data usable to enumerate functionality of the accessory device for operation as part of a computing device that includes the intermediate processor (block 502). The data, for instance, may be configured as one or more HID descriptors that may be used to enumerate the accessory device 104. This may include device and report descriptors as previously described to self-described the device in a standardized way.

The data may be passed by the intermediate processor to an operating system executed on a processor of the computing device to enumerate the functionality of the accessory device (block 504). This may include enumeration of the functionality as part of the intermediate processor 204, enumeration such that the accessory device 104 is enumerated by the intermediate processor 204 is not, and so on. Thus, the descriptors may be leveraged to provide a technique that is flexible in describing functionality that is available from the accessory device 104.

Additionally, in one or more implementations the intermediate processor 204 is enumerated as a device by the operating system such that the intermediate processor 204 is viewable by the operating system. However, in some instances the operating system may not recognize additional devices that are coupled to that device, and thus may not be able to recognize the accessory device 104. Accordingly, in such an instance the functionality of the accessory device 104 may be enumerated as part of the intermediate processor 204 such that this functionality is made available to the operating system. Thus, in this instance the accessory device 104 is not enumerated as a separate device itself in addition to the intermediate processor 204. Other examples are also contemplated in which separate enumeration is performed.

Example System and Device

Figure 6:
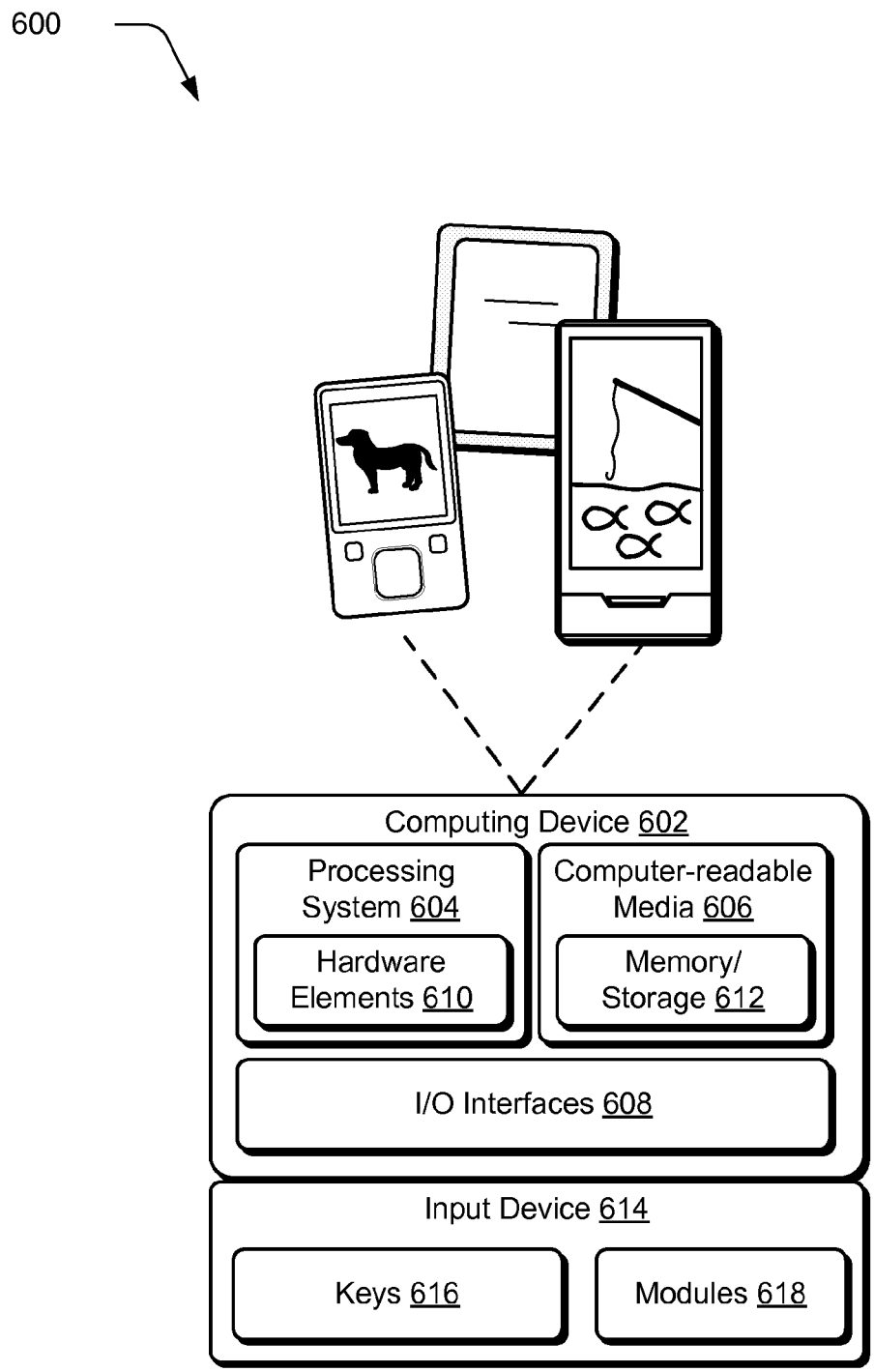
FIG. 6 illustrates an example system including various components of an example device that can be implemented as any type of computing device as described with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways to support user interaction.

The computing device 602 is further illustrated as being communicatively and physically coupled to an input device 614 that is physically and communicatively removable from the computing device 602. In this way, a variety of different input devices may be coupled to the computing device 602 having a wide variety of configurations to support a wide variety of functionality. In this example, the input device 614 includes one or more keys 616, which may be configured as pressure sensitive keys, mechanically switched keys, and so forth.

The input device 614 is further illustrated as include one or more modules 618 that may be configured to support a variety of functionality. The one or more modules 618, for instance, may be configured to process analog and/or digital signals received from the keys 616 to determine whether a keystroke was intended, determine whether an input is indicative of resting pressure, support authentication of the input device 614 for operation with the computing device 602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method comprising:
receiving a request at an intermediate processor of a computing device from a peripheral device to register for reports that include values from sensors of the computing device;
responsive to the receiving, registering the peripheral device to receive the reports that include the values from the sensors of the computing device; and
responsive to the registering, sending reports including the values of the sensors by the intermediate processor to the peripheral device without communicating the values via a processor of the computing device that executes an operating system of the computing device, the reports usable by the peripheral device to manage power usage of the peripheral device.

2. A method as described in claim 1, wherein the one or more sensors are configured to detect movement.

3. A method as described in claim 2, wherein the one or more sensors include accelerometers.

4. A method as described in claim 1, wherein the reports are usable by the peripheral device to manage power use of the peripheral device and wherein the sending is performed in response to a change that is detected in the values for the sensors.

5. A method as described in claim 1, wherein the reports are usable by the peripheral device to determine a power state in which the peripheral device is to be placed.

6. A method as described in claim 1, further comprising:
 receiving data from the peripheral device at the intermediate processor, the data usable to enumerate functionality of the peripheral device for operation as part of the computing device that includes the intermediate processor; and
 passing the data by the intermediate processor to the operating system to enumerate the functionality of the peripheral device.

7. A method as described in claim 6, wherein the data is configured to be in compliance with human interface device (HID) descriptor.

8. A method as described claim 6, wherein the functionality of the peripheral device is enumerated as part of the intermediate processor by the operating system without separately enumerating the peripheral device apart from the intermediate processor.

9. A method as described claim 6, wherein the functionality of the peripheral device is enumerated as part of the peripheral device by the operating system without separately enumerating the intermediate processor.

10. An intermediate processor comprising at least one integrated circuit configured to perform operations comprising:
 receiving a request from a keyboard to register for reports that include values from sensors of a computing device that includes the intermediate processor;
 responsive to the receiving, registering the keyboard to receive the reports that include the values from the sensors of the computing device; and
 responsive to the registering, sending reports including the values of the sensors by the intermediate processor to the keyboard without communicating the values via a processor of the computing device that executes an operating system of the computing device, the reports usable by the keyboard to manage power usage of the keyboard.

11. An intermediate processor as described in claim 10, wherein the one or more sensors are configured to detect movement.

12. An intermediate processor as described in claim 11, wherein the one or more sensors include accelerometers.

13. An intermediate processor as described in claim 10, wherein the reports are usable by the keyboard to manage power use of the keyboard and wherein the sending is performed in response to a change that is detected in the values for the sensors.

14. A method comprising:
 receiving a request at an intermediate processor of a computing device from an accessory device to register for reports that include values from sensors of the computing device, the accessory device being physically and communicatively connected to the computing device;
 responsive to the receiving, registering the accessory device to receive the reports that include the values from the sensors of the computing device; and
 responsive to the registering, sending reports including the values of the sensors by the intermediate processor to the accessory device without communicating the values via a processor of the computing device that executes an operating system of the computing device, the reports usable by the accessory device to manage power usage of the accessory device.

15. A method as described in claim 14, wherein the one or more sensors are configured to detect movement.

16. A method as described in claim 15, wherein the one or more sensors include accelerometers.

17. A method as described in claim 14, wherein the reports are usable by the accessory device to manage power use of the accessory device and wherein the sending is performed in response to a change that is detected in the values for the sensors.

18. A method as described in claim 14, wherein the reports are usable by the accessory device to determine a power state in which the accessory device is to be placed.

19. A method as described in claim 14, further comprising:
 receiving data from the accessory device at the intermediate processor, the data usable to enumerate functionality of the accessory device for operation as part of the computing device that includes the intermediate processor; and
 passing the data by the intermediate processor to the operating system to enumerate the functionality of the accessory device.

20. A method as described in claim 19, wherein the data is configured to be in compliance with human interface device (HID) descriptor.

21. A method as described claim 19, wherein the functionality of the accessory device is enumerated as part of the intermediate processor by the operating system without separately enumerating the accessory device apart from the intermediate processor.

22. A method as described claim 19, wherein the functionality of the accessory device is enumerated as part of the accessory device by the operating system without separately enumerating the intermediate processor.

* * * * *